3,559,239
MULTILAYER EXTRUSION DIE
William A. Work, Neenah, Wis., and George A. Huppenthal, Butler, N.J., assignors to American Can Company, New York, N.Y.
Filed Feb. 27, 1968, Ser. No. 708,677
Int. Cl. B29f 3/00
U.S. Cl. 18—12                                    7 Claims

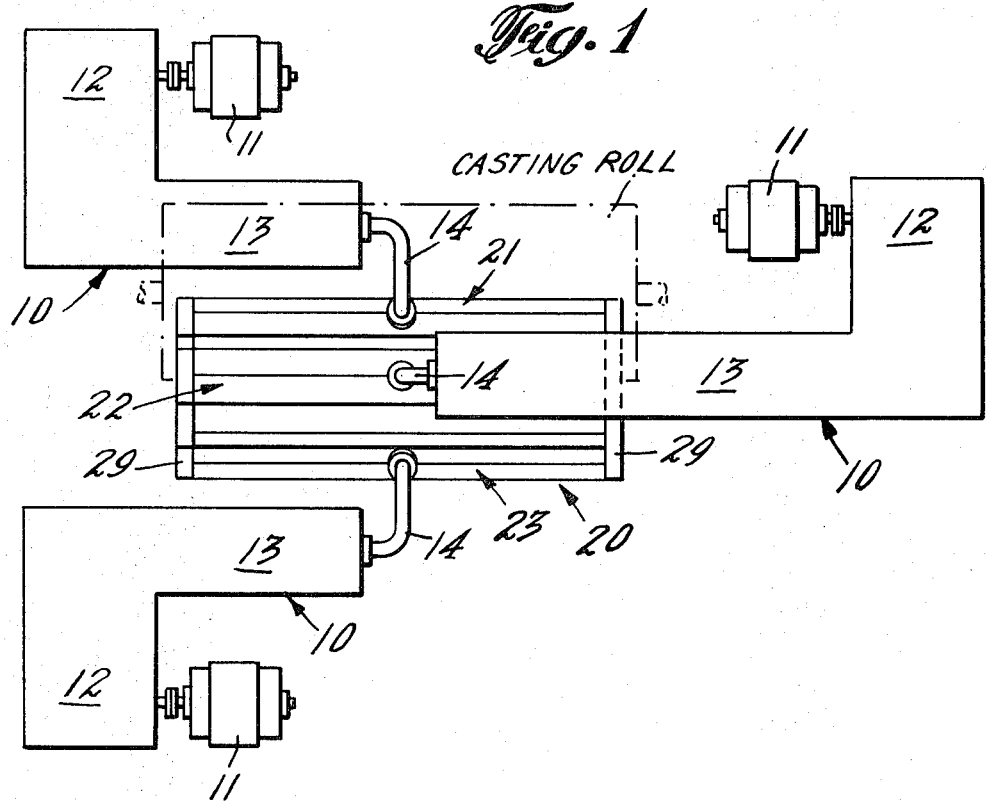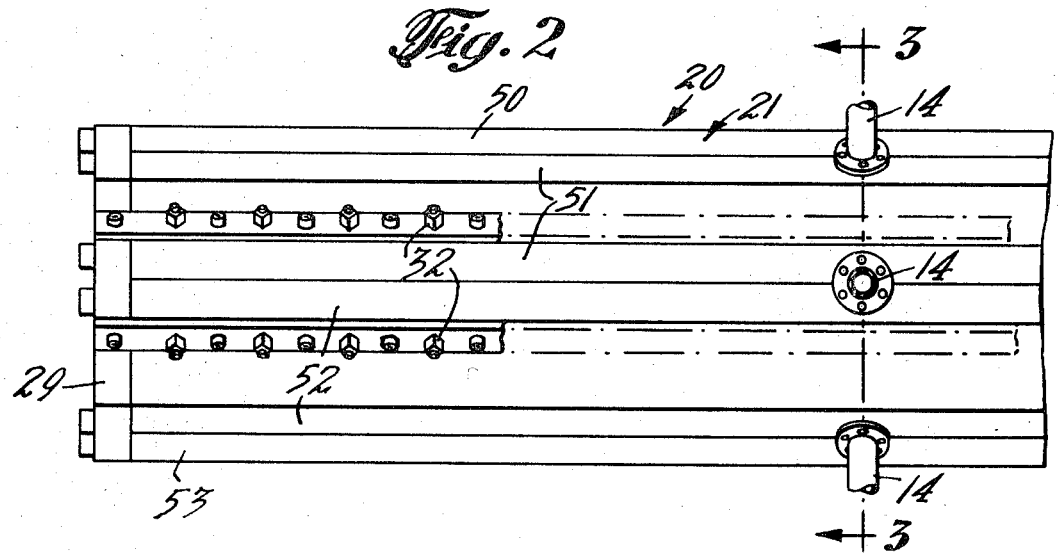

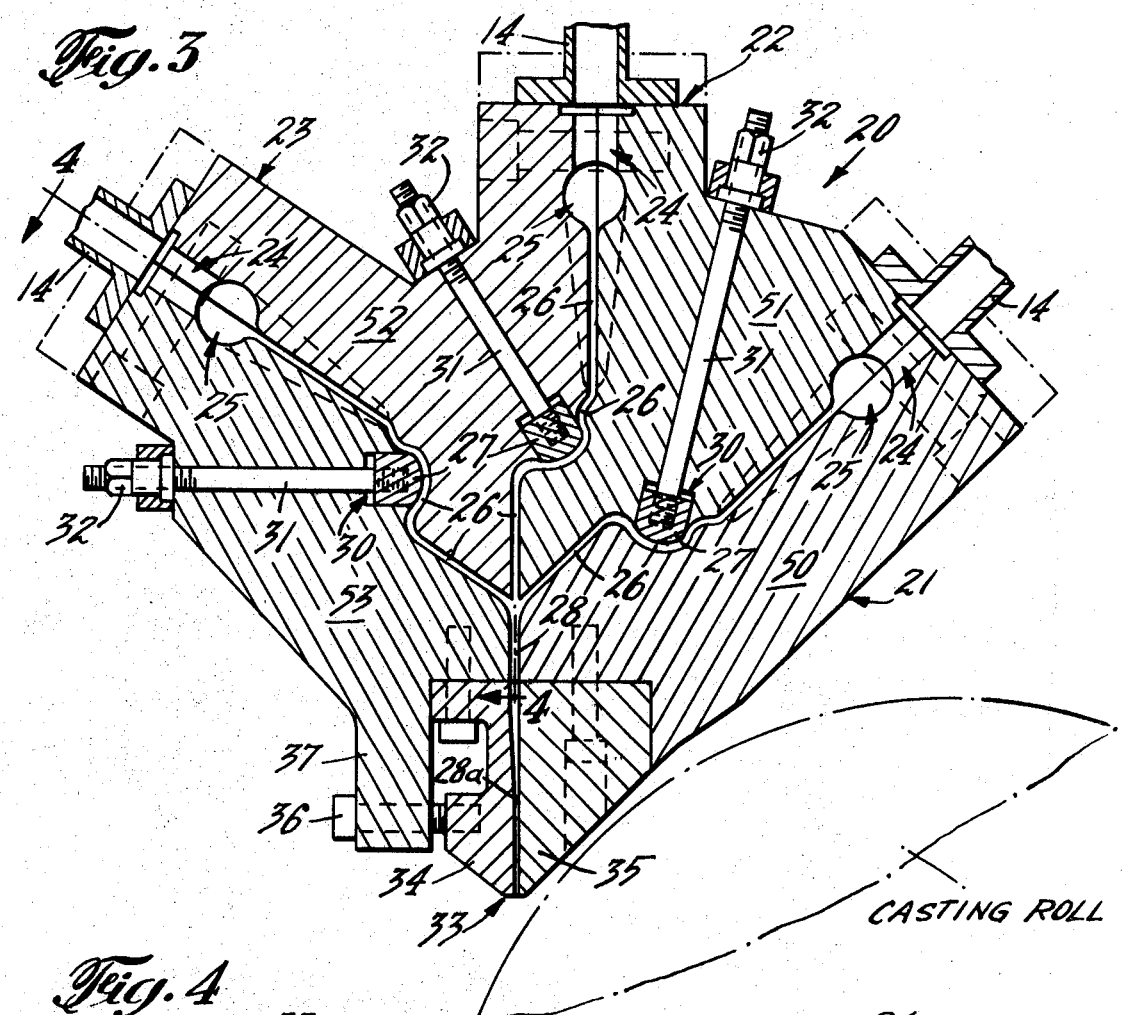
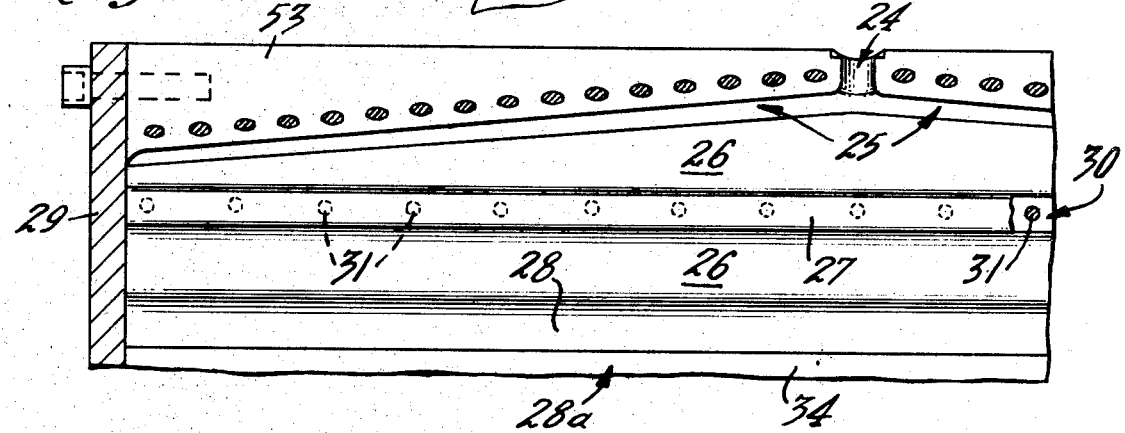
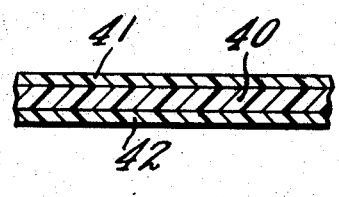

ABSTRACT OF THE DISCLOSURE

An improved extrusion die for the simultaneous extrusion of multilayer flat films or sheets of thermoplastic materials wherein improved flow passages between a plurality of manifolds supplying material from separate sources of resins and a common flow passage are provided.

BACKGROUND OF THE INVENTION

Many uses of thermoplastic films for packaging require a combination of films for product protection and improved package characteristics. Multilayer films enable a combination of properties not presently obtainable in a single material. In the past layered films were produced principally by laminating separately formed films together by adhesives or heat and pressure.

Recently, techniques have been developed for "melt laminating," i.e. two or more thermoplastic materials from separate extruders are fed through a single die, wherein the separate molten films converge and join under pressure within the die and emerge as a single laminated film. The process makes use of the laminar flow principle which enables the several molten films to join in a common flow channel without intermixing of the films at the contacting interfaces under proper operating conditions.

Among the problems associated with this process are the design and operational characteristics of the die to insure product dimensional control and obtain optimum performance of the equipment. The objects of the present invention are to provide a unique and improved extrusion die capable of producing composite film of two or more layers, and operating the die to achieve the best performance.

SUMMARY OF THE INVENTION

A die for extrusion of multilayer film wherein the different thermoplastic layers are melt laminated within the die body, and a method of utilizing said die whereby the internal profile or dimensions and disposition of the individual layers as well as the overall dimensions of the film may be regulated. The die includes separate extrusion sections each having a manifold fed from a source of molten resin and a narrow flow passage leading from the manifold to intersect with the corresponding flow passages in the other sections of the die at the inlet to a common passage which communicates with the die lip. Means are provided for individually adjusting resin flow in the flow passages. The die parts are appropriately constructed to maintain the laminar character of the different layers as they combine in the common passage and move therethrough toward the die lip.

DESCRIPTION OF THE DRAWINGS

FIG. 1 is a schematic plan view of an assembly of extrusion apparatus embodying the improved die of this invention.

FIG. 2 is a partial plan view of the die.

FIG. 3 in an enlarged sectional view taken along line 3—3 of FIG. 2, showing important features of the die.

FIG. 4 is a vertical sectional view taken substantially along line 4—4 of FIG. 3, on a reduced scale.

FIG. 5 is a cross-sectional view of one type of laminated film which can be extruded from the die illustrated in FIGS. 2–4.

DESCRIPTION OF THE PREFERRED EMBODIMENTS

The principles of this invention are capable of being practiced in the extrusion lamination of two, three or more films of similar or distinct materials. However, for illustrative purposes the drawings show an arrangement of apparatus for making a 3-layer film of two distinct resins—an intermediate layer of polyethylene and polypropylene layers on each side, as depicted in FIG. 5.

Referring to FIG. 1, there is illustrated an apparatus comprising three separate extrusion units arranged to feed into a single elongated extrusion die. For simplicity, only one extrusion unit is described since the other two are substantially identical, except for their disposition on the apparatus, and perhaps in their capacity, it being understood that the center unit for delivering the resin which forms the intermediate layer of the laminated film may have a greater capacity than the other two units which supply the two outer layers.

The extruder unit, generally designated 10, includes a drive motor 11 connected to a speed reducer 12 which in turn drives an extruder 13 of the conventional screw type. The molten resin is delivered from the heated barrel of each extruder through an elbow adaptor 14 into the appropriate opening in the extrusion die, generally designated 20. Disposed below the die is a conventional revolving casting roll, illustrated in broken lines, which receives the hot extrudate directly from the die lip and chills it to a stable condition prior to winding the film on a take-off roll, not shown. It will be understood, however, that this invention may also be practiced for applying the multilayer film directly to a substrate material, in which case the casting drum is replaced by suitable means for feeding a substrate web beneath the die in close proximity with the die lip.

As shown in FIGS. 2 and 3, die 20 is constructed as a single die body comprising three distinct flow sections designated 21, 22 and 23. Each section includes a central inlet port 24 to which adaptor 14 is bolted, a longitudinally extending cavity or manifold 25 which converges inwardly toward the center of the die and distributes the incoming molten resin over the length of the die, a narrow flow passage 26 leading from the manifold and intersecting with the passages from the other two manifolds in a common outlet passage 28, and a manually adjustable restrictor bar 27 set into and forming a part of one wall of the flow passage between manifold 25 and outlet passage 28. A pair of end plates 29 are bolted to the ends of the die body and close off the ends of the flow passages. Suitable heater units, shown in FIG. 3 in broken outline form, are mounted to the die sections adjacent the manifold inlet and are provided with spaces through which adaptors 14 are bolted to the die face.

As best shown in FIG. 4, each manifold 25 is of the well known "coat hanger" shape in the longitudinal direction, extending from inlet port 24 near the top of the die section and diverging outwardly and downwardly toward the opposite ends of the die to terminate in curved surfaces which define the sides of passage 26. The manifold is somewhat tear-dropped in section, converging inwardly from its widest point adjacent inlet port 24 to its narrowest along the line which defines the beginning of passage 26. This configuration tends to equalize the rate of flow through the manifold and into passage 26.

As shown in FIG. 3, which is a view in a cross-sectional plane normal to the width of the extruded film, each flow passage 26 follows a somewhat serpentine path from manifold 25 to its intersection in common passage 28, curving first toward restrictor bar 27, reversing its curvature around the face of the restrictor bar, and then again reversing its curvature to return to a plane path which extends into passage 28. The term "serpentine," as used herein, means a configuration having at least one reversal of curvature as in the path of each individual flow passage 26, in the neighborhood of the restrictor bar 27. The reason for this shape is to maintain smooth streamlined flow in the region of the restrictor bar and thus avoid sharp corners where the resin material tends to collect and decompose.

Restrictor bar 27 extends the full length of the die section and fits snugly within a closely dimensioned slot 30, the depth of which is greater than that of the restrictor bar to enable the desired flexure of the bar which is essential to its function in controlling the flow from the manifold 25. The inner face of the restrictor bar forms one wall of the flow passage 26 in this region and has a curvature substantially corresponding to the other wall of flow passage 26. The back face of the restrictor bar has firmly fixed thereto at closely spaced intervals a row of threaded studs 31 which extends through the die section and carry on their outer ends captive nuts 32 which engage against the outer face of the die body. These nuts are of special construction, well known in the art, so that when the nuts are rotated, the respective studs move up or down within the nut, thereby adjusting the position of the restrictor bar. It will be understood that by appropriate setting of each of the captive nuts 32 across the length of the die body, a desired flexure of the restrictor bar may be achieved by which the desired variation in the flow passage 26 is achieved.

A die lip assembly 33 of conventional construction is mounted to the bottom of the die body. This assembly bolts into a slot provided for it in the die body, and comprises a pair of die lips 34, 35 located on opposite sides of outlet passage 28 and defining a continuation 28a of this passage. Left hand lip 34 is constructed for flexure so that the die slot may be adjusted by means of a row of adjusting screws 36 which extend through slots or holes in a depending flange or plate portion 37 on die section 23. Depending on the desired gage of the multi-layer material to be run, the setting of the die lip may be varied from .020 inch or less up to .040 inch or more. For a typical 3-layer film as illustrated in FIG. 5, comprising an intermediate layer 40 of polyethylene of about .00075 inch thickness and outer layers 41 and 42 of polypropylene each about .00025 inch thickness, the die lip is set at about .020 inch. The emerging molten 3-layer film is drawn down on the casting drum to its final desired thickness. Typical dimensions of the various flow passages within the die are .090 inch for each of the three passages 26, .150 inch for passage 28, with outlet extrusion passage 28a tapering down over approximately half its length to a thin slot of adjustable dimension. The walls of the inlet end of passage 28 are smoothly curved to ensure streamlined flow of material from the flow passages 26. Center flow passage 26 joins the common passage at a straight angle. Preferably, the flow passages in this region are substantially planar, and the angle between each adjacent flow passage is acute and their corresponding walls form a sharp point. This construction minimizes the change in direction the molten resin from each flow passage must undergo as it enters common flow passage 28, and enhances the laminar joining of the three streams of resin in this passage.

It will be noted that the die body, comprising the three main sections 21, 22 and 23, is made up of four separate pieces, designated 50, 51, 52 and 53. Piece 50 is bolted to 51 along a split line which generally follows a plane extending through manifold 25 and along the serpentine path of passage 26. Similarly, piece 51 is bolted to piece 52, which in turn is bolted to piece 53. Preferably, for ease of machining and better matching, the longitudinal centerline of the manifold 25 is slightly offset with respect to the center of flow passage 26, thereby coinciding with one wall of this passage. This construction contributes to the ease of fabrication of the die body, as well as its assembly and disassembly.

The multi-layer extrusion die described above is capable of two separate and important adjustments, namely, an overall adjustment for gage control of the composite film which is accomplished by die lip assembly 33, and individual adjustment of each of the flow passages 26 by means of restrictor bars 27. The latter is extremely important to obtaining dimensional control of the individual layers 40–42, which we have termed the internal profile of the composite film, as distinguished from its overall dimensions. We have discovered that the internal profile of all three layers is sensitive to adjustments in any one of the three restrictor bars 27, and particularly the center restrictor bar.

For example, in producing film of the type and dimensions illustrated in FIG. 5, we have found that by first adjusting the restrictor bar in the center die section 22 to achieve the desired dimensional profile across the width of intermediate layer 40, the profiles of the other two layers 41 and 42 automatically fall within permissible tolerances. The reason for this apparently is in the fact that when the amount of resin flowing through the center flow passage 26 is right for the corresponding profile desired for layer 40, the laminar flow principle dictates that the amount of resin entering passage 28 from the other two manifolds is substantially the required amount for the two outer layers 41 and 42. In this sense, it could be said that adjustment of the intermediate layer is critical, since little or no adjustment of the other two restrictor bars is necessary once the center restrictor bar is properly adjusted. However, instances occur where the desired thickness ratio between the three layers is off. For example, a situation could occur where one of the two outer layers is thicker than desired, and the other is correspondingly thinner, causing an imbalance in the preferred thickness ratio between layers even though the thickness of each layer across its width is relatively uniform. In this case, a suitable adjustment to either or both of the outer restrictor bars is made to correct the imbalance.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. In a multilayer extrusion die, which includes a plurality of sections, a plurality of sources of resins, each source being connected to an elongate manifold in each section, a common passage within the die into which the resin from each section flows, and means connected to the common passage for controlling the uniformity of thickness of the multilayer film, an improved flow passage between the manifold in each section and the common flow passage comprising:

a first flow passage, having a smooth, serpentine configuration, as viewed in a cross-sectional plane normal to the width of the extruded film, communicating with the manifold;

a restrictor bar, communicating with a portion of said first flow passage, along the width thereof, said restrictor bar having a smooth profile, substantially conforming to the configuration of the portion of the first flow channel with which it communicates;

and a second flow passage, having a straight line configuration, as viewed in a cross-sectional plane normal to the width of the extruded film, communicating with said first flow passage and with the common flow passage.

2. A multilayer extrusion die, as defined in claim 1, wherein said restrictor bar has a U-shaped profile and the configuration of the portion of the first flow channel, with which it communicates, is also U-shaped.

3. The die of claim 1 wherein said common flow passage at its inlet has a gap dimension greater than the gap dimension of each of said second flow passages but less than the combined gap dimensions of said second flow passages.

4. The die of claim 1 wherein the walls of the inlet of said common flow passage are gently curved from the corresponding walls of said second flow passages and said common flow passage follows a substantially planar path of uniform gap dimensions for a portion of the distance from its inlet toward said thickness controlling means.

5. The die of claim 1 wherein said second flow passages are substantially planar in their region of communication with the common flow passage, each second flow passage intersecting at a sharp point and at an acute angle, in cross-section, with respect to the second flow passage of an adjacent section.

6. The die of claim 1 wherein said die has three sections, the walls of said common flow passage being gently smoothed from the corresponding walls of the second flow passages of the outer two of said three sections and the walls of the second flow passage of the middle of said three sections defining sharp intersections with the outer two, second flow passage walls, and the walls of the middle second flow passage being substantially parallel to the walls of said common flow passage.

7. The die of claim 6 wherein said common flow passage at its inlet has a gap dimension greater than the gap dimension of each of said second flow passages but less than the combined gap dimensions of said second flow passages; said common flow passage follows a substantially planar path of uniform gap dimensions for a portion of the distance from its inlet toward said thickness controlling means; and said second flow passages are substantially planar in their region of communication with said common flow passage, each second flow passage intersecting at a sharp point and at an acute angle, in cross-section, with respect to the second flow passage of an adjacent section.

References Cited

UNITED STATES PATENTS

| | | | |
|---|---|---|---|
| 3,218,971 | 11/1965 | Rowland | 264—171 |
| 3,443,277 | 5/1969 | Frielingsdorf | 264—171 |
| 2,734,224 | 2/1956 | Winstead | 18—12 |
| 3,464,087 | 9/1969 | Koch | 18—12 |
| 3,480,998 | 12/1969 | Von Erdberg | 18—12 |

FOREIGN PATENTS

| | | | |
|---|---|---|---|
| 985,310 | 3/1965 | Great Britain | 264—171 |

ROBERT F. WHITE, Primary Examiner

J. R. THURLOW, Assistant Examiner

U.S. Cl. X.R.

18—13; 264—171